June 7, 1932.  F. F. MALI  1,861,807
CLAMP POSITIONING DEVICE
Filed Sept. 4, 1930
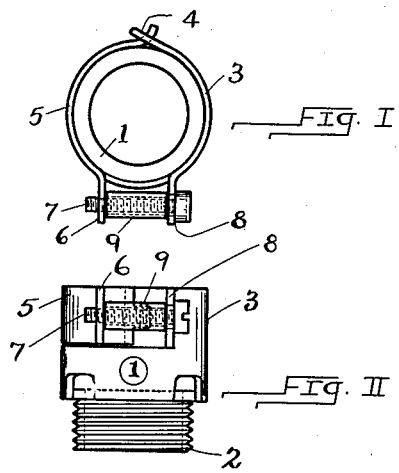
Fig. I
Fig. II
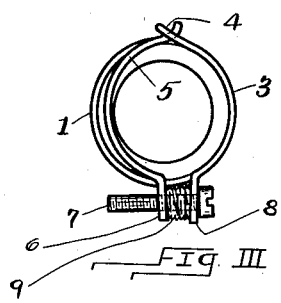
Fig. III
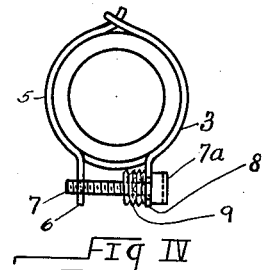
Fig. IV
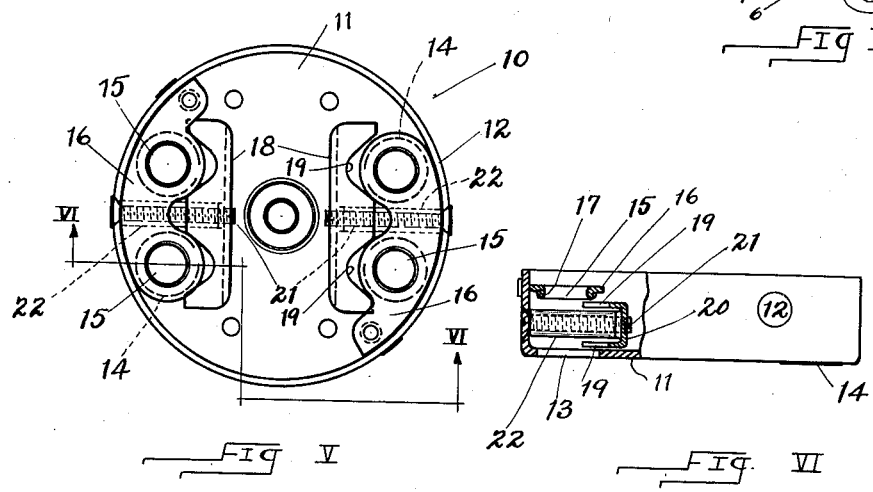
Fig. V
Fig. VI
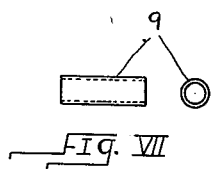
Fig. VII
INVENTOR
Frank F Mali
by Christy Christy and Wharton
attorneys Patented June 7, 1932

1,861,807

UNITED STATES PATENT OFFICE

FRANK F. MALI, OF NEW BRIGHTON, PENNSYLVANIA, ASSIGNOR TO NATIONAL ELECTRIC PRODUCTS CORPORATION, A CORPORATION OF DELAWARE

CLAMP-POSITIONING DEVICE

Application filed September 4, 1930. Serial No. 479,644.

My invention relates to a clamping device; a device, for example, which is adapted to secure the end of an electrical cable or conduit in an outlet-box. In an outlet-box, as commonly constructed, such device comprises a clamping member which is movable into contact with the wall of the cable to be clamped, in response to the rotation of a screw. Manifestly, the clamping elements must be maintained in separated, cable-receiving position to permit the insertion of the cable end. The maintenance of the clamping elements in open position for the ready insertion of a cable is a problem, and it is with inexpensive and effective means to overcome this problem that my invention has particularly to do; the structure of the clamping device itself is not of immediate concern.

In brief, the invention consists in the provision of a collapsible sleeve upon the shank of a clamp-operating screw. The sleeve is located upon such shank between the co-operating clamping elements which are adapted to close upon the thing to be clamped, and the dimensions of the sleeve are such that it functions to hold the clamping parts temporarily in separated relation for the reception of the member to be clamped. When the member to be clamped (an electrical cable in the case of an outlet-box) is suitably positioned, the clamping screw is rotated to move the clamping elements together and into operative position. The collapsible spacer or sleeve is of sufficient strength normally to hold the clamping device in open position, but it is of insufficient strength to withstand the forces of the clamping elements as they are brought together by the screw. The sleeve gives way and collapses upon the bringing of the parts to clamping position.

My structure finds utility in many devices other than outlet-boxes. This fact will be realized in the illustrations in the accompanying drawing, in which Fig. I is a view in elevation of the top of a hinged connector for electrical conduits. Fig. II is a view of the connector in front elevation showing, as does Fig. I, the clamping parts of the device in position to receive a conduit. Fig. III is a view corresponding to Fig. I, showing, however, the parts in closed or clamping position. Fig. IV is another view in plan of the connector, illustrating the position of the collapsed spacer when the device has been opened to release a conduit which had been clamped therein. Fig. V is a view in plan of an outlet-box of well-known structure; the cover of the box is removed, showing its clamping elements in elevation. Fig. VI is a view taken on the line VI—VI of Fig. V, showing the outlet-box partly in side elevation and partly in cross section. And Fig. VII illustrates in side and end elevations a convenient form of collapsible spacer for use in accordance with my invention.

The structure of a hinged connector is well known to the art. In general, it comprises a tubular body to which the reference numeral 1 is immediately applied in the drawing. The body 1 includes a lower threaded portion 2 for engagement in an associated fixture (not shown), and an upper clamp portion 3, integral with the body 1. Hinged at one end (by means of a tongue-and-slot connection 4) to the clamp portion 3 is a clamping element 5, and the other end of the element 5 forms a tongue 6 which has a threaded hole to engage a clamp-operating screw 7. The clamp portion 3 which is integral with the body 1 is provided with a tongue 8, and through this tongue 8 the screw 7 freely extends. Upon the screw shank and between the tongues 6 and 8 is a collapsible spacer 9, serving normally to maintain the clamp elements 3 and 5 in separated, cable-receiving position, as indicated in Figs. I and II. A cable or conduit obviously may be readily inserted in the body of the connector, and when the cable is suitably adjusted therein, the screw 7 is rotated, drawing the clamp element 5 toward the portion 3. The spacer 9 advantageously is in form a sleeve or tube of material which may be intentionally compressed along its axis. Paper pulp, or a similar fibrous material, has been found to be a desirable substance (a substance having the required compressible or collapsible characteristics) of which to make the spacer 9. I also contemplate rubber or the like, as a material of which to form the spacer, but a fibrous material is cheaper and in general more to be desired. The screw 7 is turned into the tongue 6 until the clamping element 5 has moved into clamping position, as shown in Fig. III. The cable is not shown in the drawing, but it is evident that the running home of the screw 7 will be efficient to clamp tightly the cable between the elements 3 and 5. The spacer 9 is shown in Fig. III in its longitudinally collapsed condition.

Figs. I and II indicate how the spacer 9 functions to hold the clamping elements 3 and 5 in cable-receiving position. It is also important to note that sleeve 9 may serve as a spacer after it has been collapsed. That is to say, when the clamping elements are opened to remove the cable (it often being desirable in practice to do so), the collapsed sleeve 9 has been found to form in effect a fixed collar upon the shank of the screw 7, and as such serves to confine the lug 8 of clamping element 3 between itself and the head 7a of the screw. So, one clamping element (3) is held on the screw between the collapsed or wadded spacer 9 and the head 7a, while the other clamping element (5) is stayed by the threaded engagement of its lug 6 with the shank of the screw (see Fig. IV). In other words, the function of the sleeve 9 as a spacer does not end when it has been collapsed. Although a rubber sleeve does not form a wadded mass on the shank of the clamping screw, in the sense that a paper sleeve does, I have found that when a thin rubber tube has been axially compressed on the screw 7, the same effect is had, that is, the threads of the screw are so embedded in the rubber as to prevent the rubber spacer from returning to its original elongated form.

In Figs. V and VI there is illustrated an outlet-box 10. The form of this outlet-box is a matter of common knowledge; Patent No. 1,638,510, issued August 9, 1927, describes in detail its structure and operation. However, to understand clearly the embodiment of my invention therewith, a brief description of such outlet-box will be given.

The body of the box comprises a base or floor 11 having an outwardly-projecting sidewall 12. The floor is provided with openings 13 for the introduction of electrical cables, which openings are originally closed by the usual knock-outs 14. Bushings 15 for the conductors are provided, which are shown as formed in brackets or shelves 16 secured to the wall 12 above floor 11. The bushings 15 are drifted in the brackets, and the edges of the metal forming the openings are curled and beaded, as shown at 17 in Fig. VI. This is preferable when armored cable is being used, the armor being cut away below the bracket and the beaded edge 17 of the opening serving to protect the bare insulation of the conductors from injury by contact with the sharp edge of the armor.

For securing the cable, which has been inserted through opening 13 (Fig. VI), in place in the box adjustable clamping elements 18 are employed. The clamping elements 18 are located in the spaces between the respective brackets 16 and the floor of the box, and each clamping element is of a channel section, the opposite horizontally arranged flanges of which are provided with vertically aligned notches 19 adapted to engage the cable (not shown). Each clamping element 18 has a threaded hole in its web 20 to receive the threaded shank of an adjusting screw 21, which is projected through the side wall 12 of the box. By turning the screw 21 the clamping element will be drawn outwardly, and the edges of the vertically aligned notches 19 will be caused to engage the surface of the cable and bind it firmly against the inner face of the wall 12 as well as the edge of the knock-out opening 13 in the floor 11. It will, therefore, be understood that the inner face of the wall 12 and the edge of the respective knock-out openings cooperate with the clamping elements 18, and are themselves clamping elements.

In this device there is the matter of maintaining the clamping elements 18 in suitable cable-receiving position to contend with. That is to say, it is necessary that the clamping elements be substantially in the position in which they are indicated in Figs. V and VI to permit the ready insertion of the cable. The elements 18 are positioned so that notches 19 clear the knock-out holes 13. This is the arrangement of the parts for the reception of a cable, and in temporarily retaining the parts in this position my collapsible spacing sleeve is effective. In the drawing a sleeve 22 is shown upon the shank of each screw 21.

The sleeves 22 extend on the screw between the clamping elements 18 and the wall 12. The sleeves 22 are collapsible, as the sleeve 9 is collapsible; and they are of such dimensions as to support the clamping elements in the desired arrangement for the reception of a cable. Of course, the spacers 22 collapse or fold longitudinally upon themselves when the screws 21 are rotated to move the elements 18 into clamping position.

I am aware of the fact that special screws have hitherto been provided with grooves or necks, protuberances, or wire collars on their shanks for the purpose of staying one of the clamping elements in position against the head of the clamping screw, thereby maintaining (the other associated clamping element being in threaded engagement with the screw) both clamping elements in adjusted position. It is a fact that helical springs have also been employed to this general end, but the springs, as well as the above mentioned specialized screws, are undesirable for economic reasons. These different types of screws are all relatively costly to manufacture, and are difficult to install in clamping devices. The helical springs are not necessarily expensive to make, but they are handled in bulk (this being the only commercially feasible manner of handling them) and the untangling of each spring from the mass of springs is a slow operation. Further time is lost in the assembling of the springs upon the shanks of the clamping screws; that is, it is difficult to slip a spring quickly over a threaded shank, because of the fact that the wires of the springs snag on the threads.

My collapsible spacing sleeve obviates these undesirable features which accompany the use of such known structures; the sleeves are inexpensive, and admit of quick assembling. Conveniently, the walls of the collapsible spacing sleeves are $\frac{1}{32}$ of an inch thick, while their lengths are determined by the structural characteristics of the particular clamping devices in which they are to be used. A paper sleeve may be caused to collapse along its axis from a length of one inch to a length of about $\frac{1}{8}$ of an inch.

I claim as my invention:

1. In an electrical fixture including one clamping element which is movable relatively to a cooperating clamping element for securing between them a cable or conduit, and a screw which is associated with said clamping elements for effecting their relative movement, the combination of a collapsible spacer which temporarily retains said clamping elements in separated, cable-receiving position, which spacer is adapted to buckle upon the rotation of said screw to bring said elements into cable-clamping position.

2. The structure recited in claim 1, in which said spacer comprises a collapsible sleeve upon the shank of said screw and between said clamping elements.

3. In a device including two elements which are movable one toward the other by means of a screw, the combination of a collapsible spacing sleeve upon the shank of said screw and between said elements which sleeve is adapted to buckle, and to remain so, when said screw is rotated to move said elements together.

4. In a device including two elements which are movable one toward the other by means of a screw, the combination of a collapsible spacer associated with said screw and between said elements, which spacer is adapted to buckle when said screw is rotated to move said elements together.

5. In a device including two clamping elements which are movable one toward the other by means of a screw, the combination of a collapsible spacer upon the shank of said screw and between said clamping elements, which spacer, when it has been collapsed, tends to remain so and forms in effect a collar on the shank of said screw.

In testimony whereof I have hereunto set my hand.

FRANK F. MALI.